(12) United States Patent
Cannon et al.

(10) Patent No.: US 7,202,195 B2
(45) Date of Patent: Apr. 10, 2007

(54) METHOD OF HEAT TREATING CARBONACEOUS MATERIAL TO ENHANCE ITS ADSORPTION OF TASTE-AND-ODOR-CAUSING AND OTHER ORGANIC COMPOUNDS FROM WATER

(75) Inventors: Fred S. Cannon, State College, PA (US); Kirk O. Nowack, River Edge, NJ (US); David W. Mazyck, Gainesville, FL (US); Kenya M. Goins, State College, PA (US); Brian C. Moore, Clifton Park, NY (US); C. Robert Thomas, Cumming, GA (US); Jose Rene Rangel Mendez, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 364 days.

(21) Appl. No.: 10/085,469

(22) Filed: Feb. 28, 2002

(65) Prior Publication Data

US 2003/0062312 A1   Apr. 3, 2003

Related U.S. Application Data

(60) Provisional application No. 60/272,091, filed on Feb. 28, 2001.

(51) Int. Cl.
  *C01B 31/08* (2006.01)
(52) U.S. Cl. .................................................. 502/416
(58) Field of Classification Search ................ 502/416
  See application file for complete search history.

(56) References Cited

U.S. PATENT DOCUMENTS

| | | | |
|---|---|---|---|
| 4,150,045 A | 4/1979 | Sinha | |
| 4,154,750 A | 5/1979 | Moore et al. | |
| 4,458,022 A | 7/1984 | Ohsaki et al. | ................. 502/42 |
| 4,960,450 A | 10/1990 | Schwarz et al. | ................ 62/18 |
| 5,013,698 A | 5/1991 | Lonsinger et al. | ............. 502/27 |
| 6,064,560 A | 5/2000 | Hirahara et al. | ............. 361/502 |
| 6,865,068 B1 * | 3/2005 | Murakami et al. | .......... 361/502 |

FOREIGN PATENT DOCUMENTS

| | | |
|---|---|---|
| EP | 0385742 A | 9/1990 |
| EP | 0784032 | 7/1995 |
| EP | 0794240 A | 9/1997 |
| EP | 0913360 | 10/1997 |
| JP | 08231212 | 9/1996 |
| JP | 09315809 | 12/1997 |

OTHER PUBLICATIONS

International Search Report PCT/US02/05889, Filed Feb. 28, 2002.
Herzing et al., "Activated Carbon Adsorption of the Odorous Compounds 2-Methylisoborneol and Geosmin," Journal AWWA, Apr. 1977, pp. 223-228.

Lalezary-Craig et al., "Optimizing the Removal of Geosmin and 2-Methylisoborneol by Powdered Activated Carbon," Research and Technology.

Chen et al., "Evaluation of Granular Activated Carbons for Removal of Methylisoborneol to Below Odor Threshold Concentration in Drinking Water," Wat. Res. vol. 31, No. 5, pp. 1155-1161, 1967, Elsevier Science Ltd.

Ellis et al., "Removal of Geosmin and Methylisoborneol from Drinking Water by Adsorption on Ultrastable Zeolite-Y," Wat. Res., vol. 27, No. 4, pp. 535-539, 1993, Pergamon Press Ltd.

Terauchi et al., "Studies on a Biological Filter for Musty Odor Removal in Drinking Water Treatment Processes," Wat. Sci. Tech., vol. 31, No. 11, pp. 229-235, 1995, IAWQ.

Lalezary et al., "Evaluating Activated Carbons for Removing Low Concentrations of Taste-and Odor-Producing Organics," Research and Technology.

Coughlin et al., "Role of Surface Acidity in the Adsorption of Organic Pollutants on the Surface of Carbon," Environmental Science and Technology, Jan. 1958. pp. 291-297.

Randtke et al., "Evaluating GAC Adsorptive Capacity." Journal AWWA, Aug. 1983, pp. 406-413.

McCreary et al., "Granular Activated Carbon in Water Treatment," Journal AWWA. Aug. 1977, pp. 437-444.

Levi et al., "Offensive Tastes and Odors Occurring After Chlorine Addition in Water Treatment Processes." Wat. Sci. Tech., vol. 20, No. 8/9. pp. 269-274, 1998, IAWPRC.

Chudyk et al., "Activated Carbon Versus Resin Adsorption of 2-Methylisoborneol and Chloroform," Journal AWWA, Sep. 1979, pp. 529-538.

(Continued)

*Primary Examiner*—Stuart Hendrickson
(74) *Attorney, Agent, or Firm*—Ohlandt, Greeley, Ruggiero & Perle, L.L.P.

(57) ABSTRACT

An activated carbon that is capable of adsorbing taste-and-odor-causing and other organic compounds, wherein the activated carbon comprises a uniquely modified carbonaceous material. The activated carbon comprising: (a) a pore volume per gram of the activated carbon more than about 0.32 mL in the pore width range between about 4 to 63 angstroms; and (b) a pore volume per gram of the activated carbon more than about 0.21 mL in the pore width range between about 63 to 500 angstroms; provided that the pore volume per gram of the activated carbon in the pore width range of about 20 to 63 angstroms is at least about 25% of the total pore volume per gram of the activated carbon in the pore width range of 4 to 63 angstroms, as measured per the Argon Adsorption Density Functional Theory protocol; provided that the activated carbon has a pH equal to or greater than 9.9, when immersed as a slurry in nitrogen-purged deionized distilled water, while the slurry contains about 10% by weight of activated carbon, as measured per the Slurry pH protocol.

14 Claims, 6 Drawing Sheets

OTHER PUBLICATIONS

Gillogly et al., "Kinetic and Equilibrium Studies of 14C-MIB Adsorption on PAC in Natural Water," University of Illinois at Urbana-Champaign, Dept. of Civil Engineering, pp. 627-645.

Vik et al., "Pilot Scale Studies of Geosmin and 2-Methylisoborneol Removal." Wat. Sci. Tech. vol. 20, No. 8/9. pp. 229-236. 1988, IAWPRC.

Huang et al., "Adsorption Kinetics of MIB and Geosmin, " Apr. 1996, pp. 116-128.

Ando et al., "Removal of Musty-Odorous Compounds in Water and Retained in Algal Cells Through Water Purification Process." Wat. Sci. Tech., vol. 25, No. 2, pp. 299-306. 1992. IAWPRC.

McGuire et al., "Overview of Technology for Controlling Off-Flavors in Drinking Water," Wat. Sci. Tech., vol. 20, No. 8/9, pp. 215-228, 1998 IAWPRC.

Burlingame et al., "A Case Study of Geosmin in Philadelphia's Water."

Corapcioglu, M. O. et al., "The Surface Acidity and Characterization of Some Commercial Activated Carbons," Carbon. Elsevier Science Publishing, New York, New York, U. S., vol. 25, No. 4, 1987, pp. 569-578.

Norit Americas Inc., "Products and Services: How to get the best activated carbon for your application" May 2002 Marshall, Texas.

European Search Report dated Feb. 15, 2006 on connection with European Application No. 05027714.4-2111.

* cited by examiner

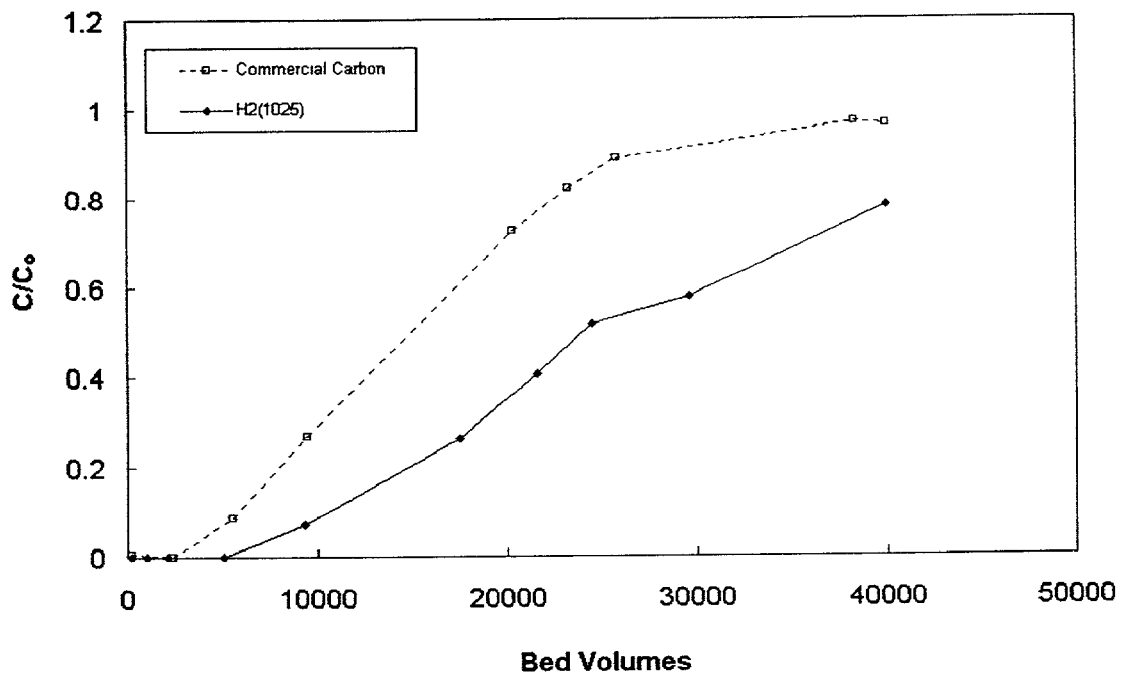
FIGURE 1. MIB breakthrough profiles in Norristown water
(Influent MIB Conc. = 135 ng/L; Influent TOC = 3.7 mg/L)
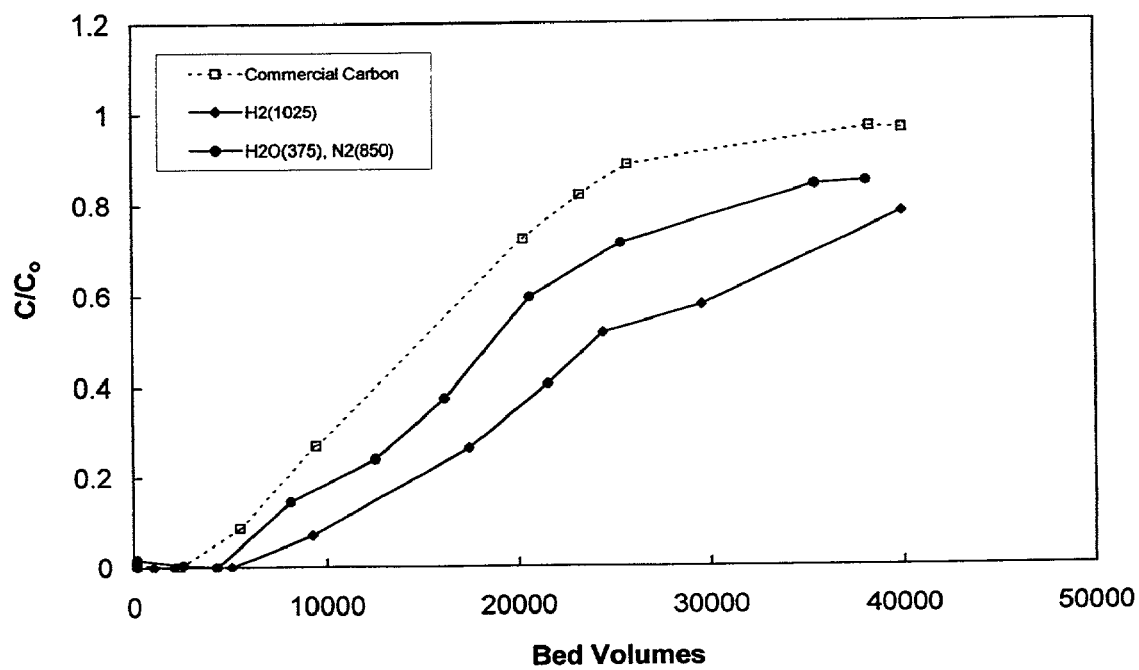
FIGURE 2. MIB breakthrough profiles in Norristown water
(Influent MIB Conc. = 135 ng/L; Influent TOC = 3.7 mg/L)

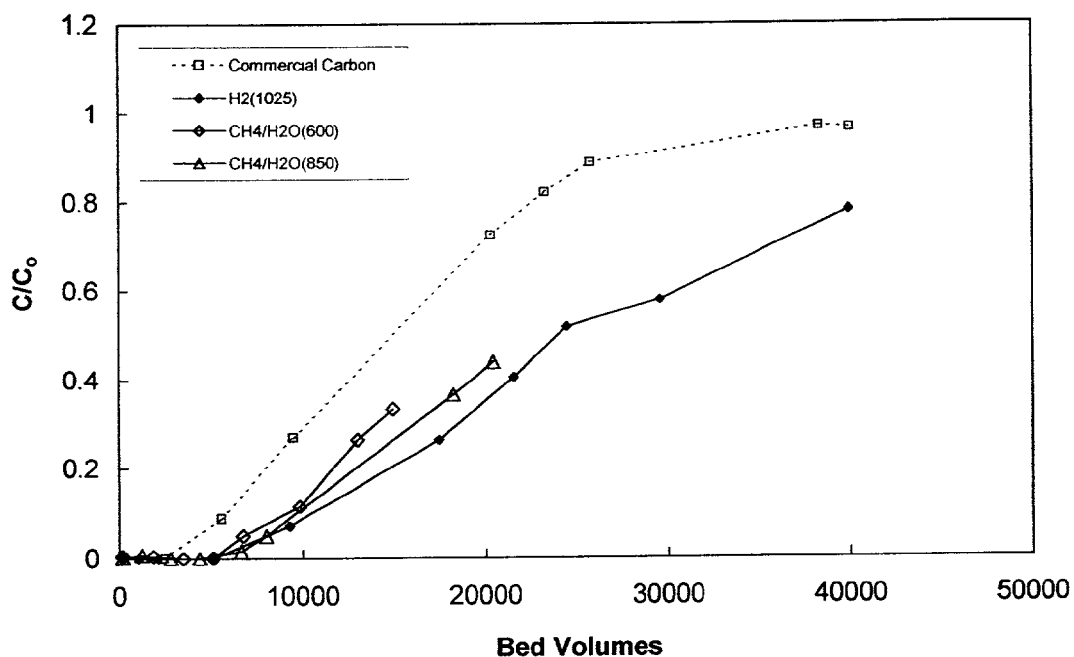
FIGURE 3. MIB breakthrough profiles in Norristown water
(Influent MIB Conc. = 135 ng/L; Influent TOC = 3.7 mg/L)
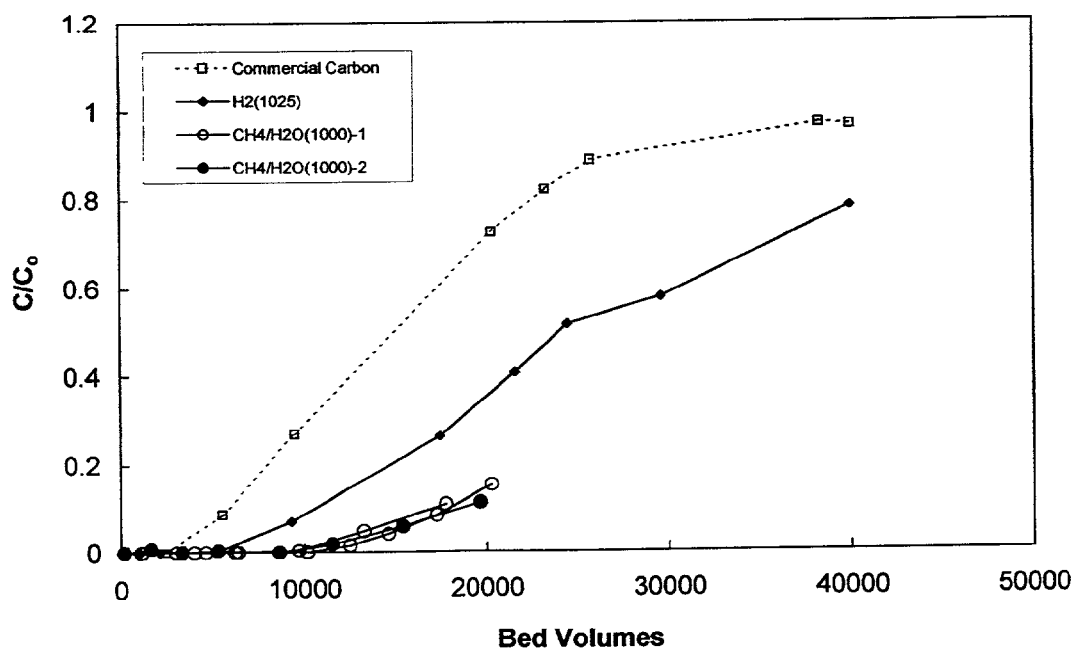
FIGURE 4. MIB breakthrough profiles in Norristown water
(Influent MIB Conc. = 135 ng/L; Influent TOC = 3.7 mg/L)

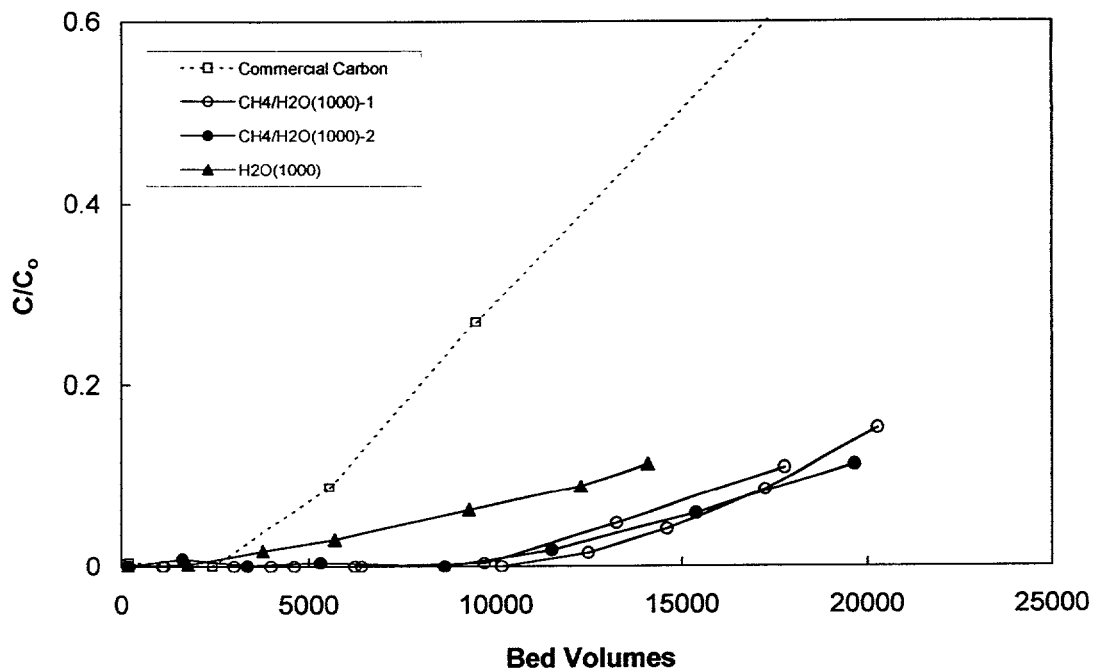
FIGURE 5. MIB breakthrough profiles in Norristown water (Influent MIB Conc. = 135 ng/L; Influent TOC = 3.7 mg/L)
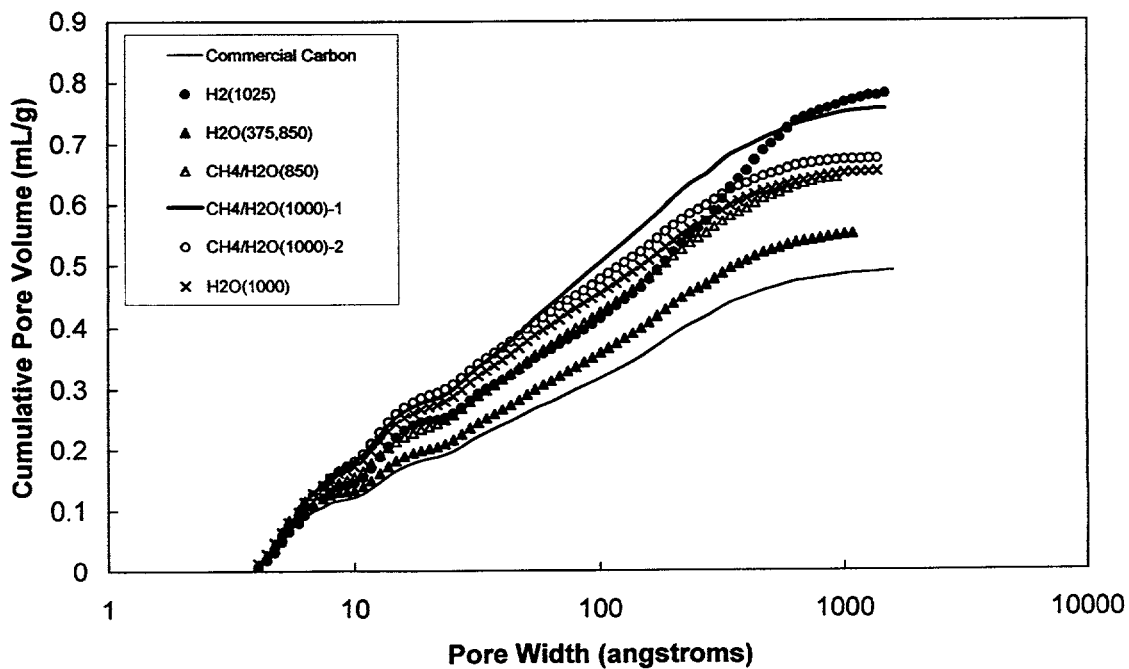
FIGURE 6. Pore size distributions for commercial and experimental carbons FIGURE 7. Correlations between MIB breakthrough performance and cumulative pore volume for various pore width ranges
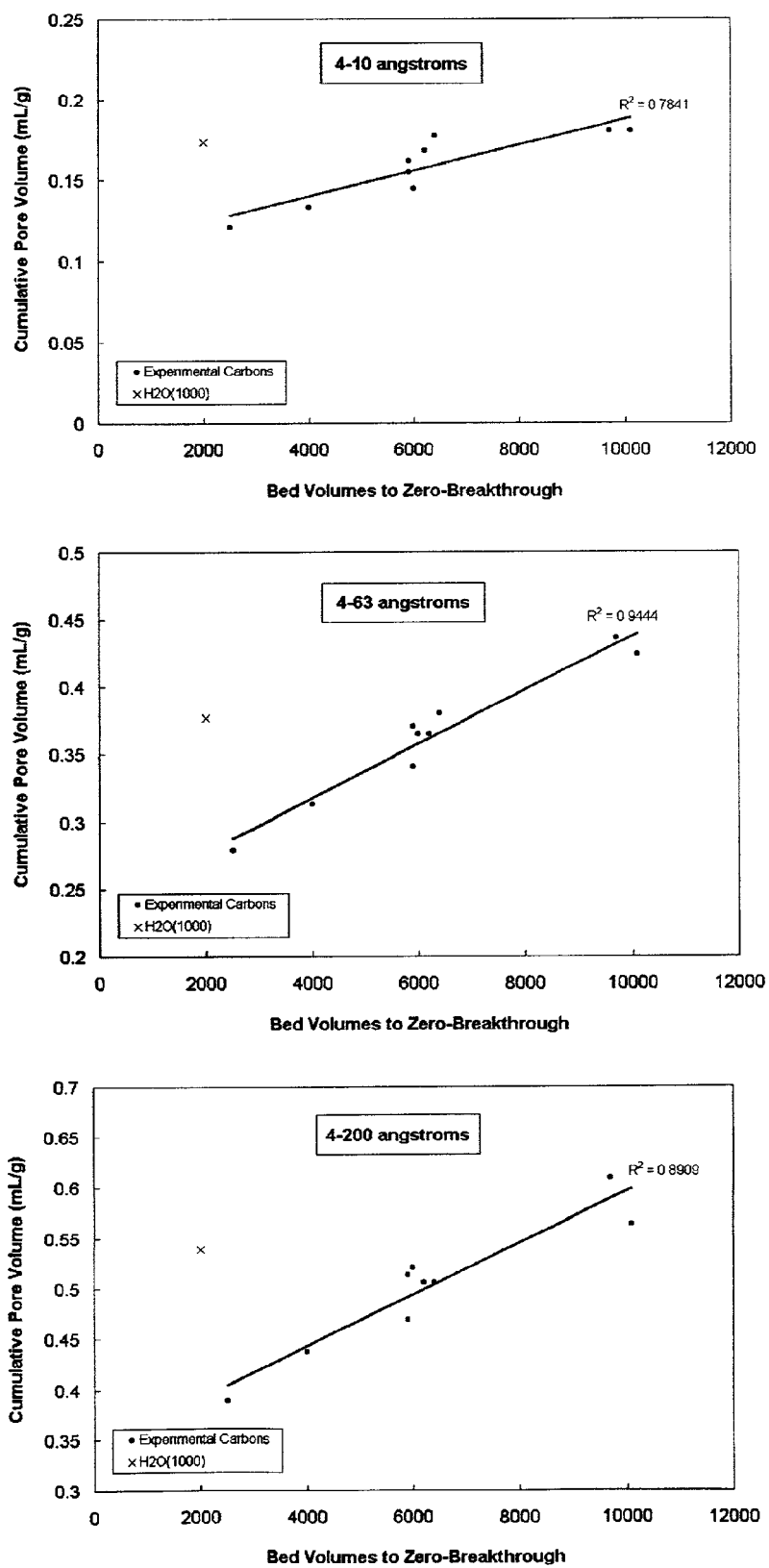

FIGURE 8. TOC uptake by "as-received" and "surface-modified" bituminous coal-based activated carbons (Initial TOC = 1.2 mg/L)
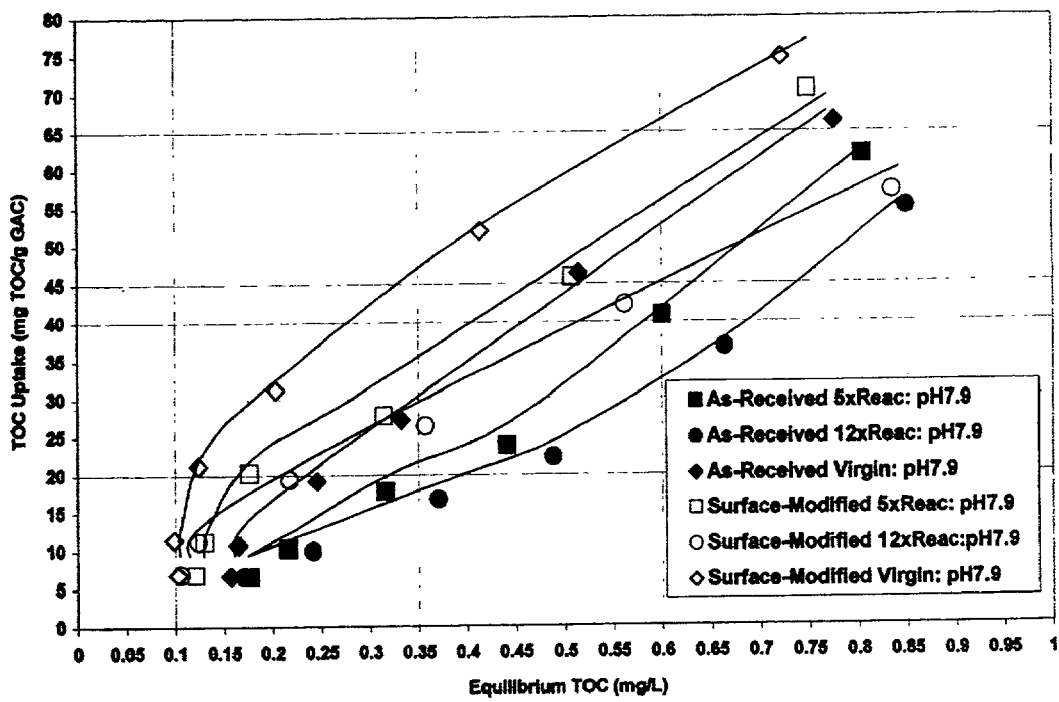
FIGURE 9. Net surface charge distributions for "as-received" and "surface-modified" virgin bituminous coal-based activated carbon
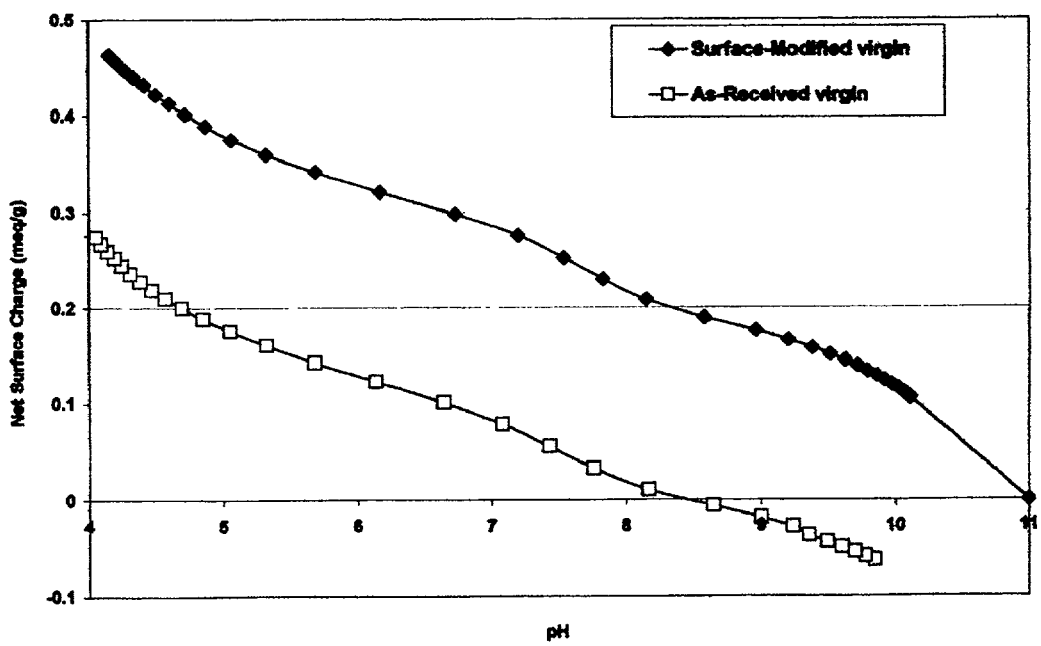

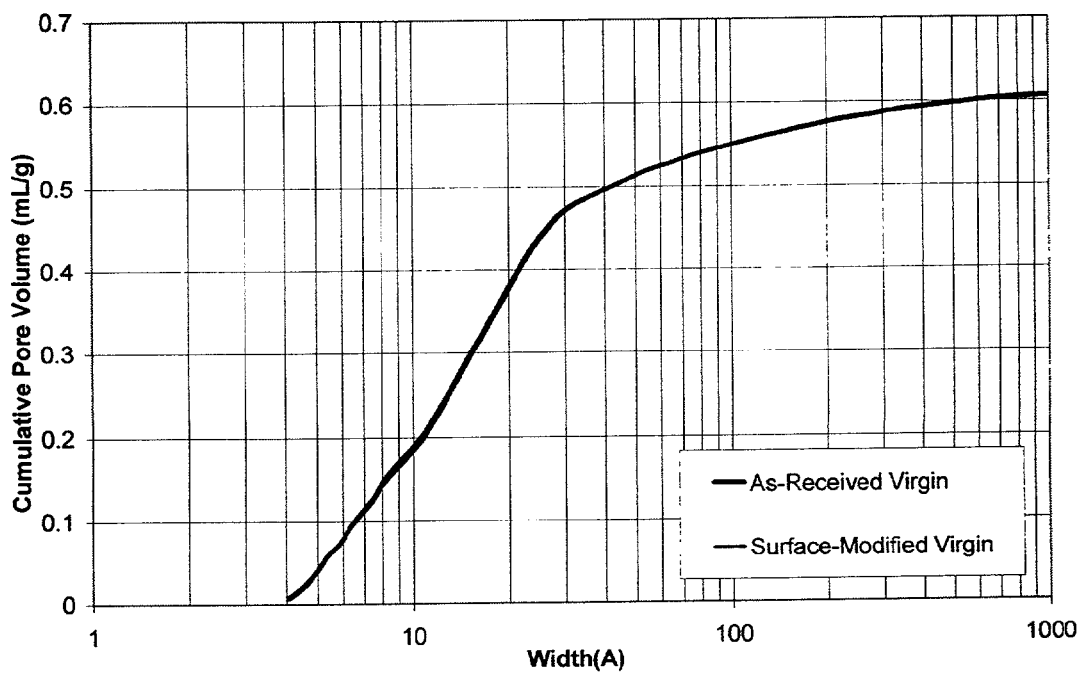
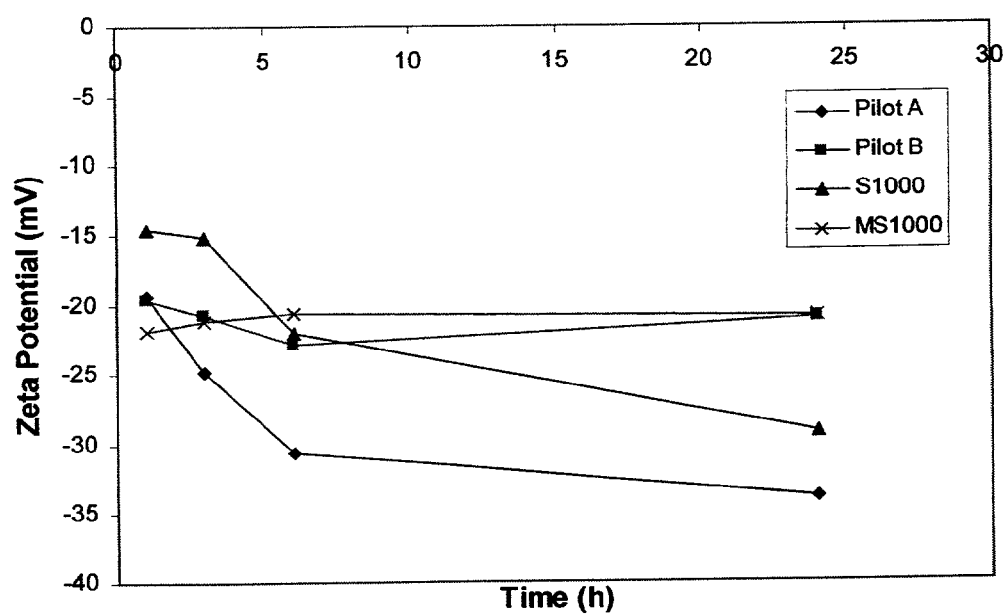
Figure 11. Average zeta potential (mV) of steam- and methane + steam-treated carbons following varying periods of oxygen exposure.

METHOD OF HEAT TREATING CARBONACEOUS MATERIAL TO ENHANCE ITS ADSORPTION OF TASTE-AND-ODOR-CAUSING AND OTHER ORGANIC COMPOUNDS FROM WATER

This application claims priority from U.S. Provisional Application No. 60/272,091, filed on Feb. 28, 2001.

The present invention generally relates to a method of heat treating carbonaceous material in the presence of gases that alter pore size and surface characteristics, thereby substantially enhancing the adsorption capacity above existing commercial grade activated carbons for certain odor causing compounds, such as 2-methylisoborneol (MIB) and geosmin, and for other organic compounds.

BACKGROUND OF THE INVENTION

Taste and odor have long been associated with the aesthetic suitability of drinking water, although many tastes and odors are not known to be harmful. Some people today will reject potable water simply because it smells or tastes bad. Two of the primary natural causes of disagreeable flavors and odors in surface waters are 2-methylisoborneol (MIB) and geosmin, which are musty-smelling, organic chemicals that are produced by microorganisms. Both compounds can cause detectable tastes and odors in water at concentrations as low as 7 to 15 parts per trillion. Also, MIB and geosmin have been linked to taste-and-odor episodes around the world, and are therefore a global concern. Consequently, effective treatment technologies for controlling MIB- and geosmin-related tastes and odors have garnered much attention.

Numerous studies of treatment techniques for taste-and-odor control have established that activated carbon adsorption is an effective method for removing MIB and geosmin from water. However, activated carbon has a finite capacity for adsorbing organic compounds, and this capacity is generally diminished when the target compound(s) compete(s) for adsorption sites with the natural organic matter found in water. There are significant costs and operational challenges associated with discarding and replacing activated carbon that has become exhausted in its capacity to adsorb organic compounds. Hence there is a need to increase the service life of activated carbon for taste-and-odor removal.

The present invention described herein encompasses several techniques for producing tailored activated carbons with much longer service lives for removing MIB and (by inference) geosmin than current commercial activated carbon products.

The present inventors have discovered that heating an activated carbon in certain gas environments caused favorable changes in the carbon's pore size distribution and surface characteristics. As demonstrated hereafter, the present inventors discovered that taste-and-odor removal, as measured by MIB breakthrough performance, was closely correlated with the carbon properties affected by these heat treatments.

As a broader application, activated carbon is also commonly used to remove a variety of naturally occurring and synthetic organic compounds from water. The present invention described herein could impact all of these activated carbon applications.

The present invention also provides many additional advantages that shall become apparent as described below.

SUMMARY OF THE INVENTION

An activated carbon that is capable of adsorbing taste-and-odor-causing and other organic compounds, wherein the activated carbon comprises a uniquely modified carbonaceous material. The activated carbon comprising: (a) a pore volume per gram of the activated carbon more than about 0.32 mL in the pore width range between about 4 to 63 angstroms; and (b) a pore volume per gram of the activated carbon more than about 0.21 mL in the pore width range between about 63 to 500 angstroms; provided that the pore volume per gram of the activated carbon in the pore width range of about 20 to 63 angstroms is at least about 25% of the total pore volume per gram of the activated carbon in the pore width range of 4 to 63 angstroms, as measured per the Argon Adsorption Density Functional Theory protocol; provided that the activated carbon has a pH equal to or greater than 9.9, when immersed as a slurry in nitrogen-purged deionized distilled water, while the slurry contains about 10% by weight of activated carbon, as measured per the Slurry pH protocol.

An adsorber containing grains of the activated carbon can: (A) remove $^{14}C$-labeled 2-methylisoborneol (MIB) down to 10 parts per trillion or less for at least 12,000 bed volumes when processing water that contains 130–140 parts per trillion $^{14}C$-MIB and at least 3.5 mg/L of background organic matter (measured as total organic carbon), and (B) remove $^{14}C$-MIB down to 4 parts per trillion or less for at least 7500 bed volumes when processing water that contains 130–140 parts per trillion $^{14}C$-MIB and at least 3.5 mg/L of background organic matter (measured as total organic carbon).

Moreover, the activated carbon preferably exhibits a mobility-based zeta potential at a pH of 10.5 that does not vary ± more than 3 mV between the time that said activated carbon is exposed for about 1 hour and about 24 hours to deionized distilled water through which an excess of gaseous oxygen is bubbled, as measured per the Mobility-Based Zeta Potential protocol.

The activated carbon according to the present invention is capable of removing natural organic matter, methyl tert butyl ether, chlorinated organic compounds, aliphatic organic compounds, aromatic organic compounds, and/or mixtures thereof.

The present invention also provides for a method of producing activated carbon comprising: heating a carbonaceous material to a temperature in the range between about 300 to 1400° C. for a period of time in the range between about 0.1 to 500 minutes in the presence of at least one gas selected from the group consisting of: hydrogen, steam, methane and/or natural gas, provided that the mass ratio of at least one of these said gases to initial activated carbon is greater than about the following: 0.7 grams said steam: 1.0 grams initial dry carbonaceous material, and/or 0.35 grams said methane and/or natural gas: 1.0 grams initial dry carbonaceous material, and/or 0.35 grams said hydrogen: 1.0 grams initial dry carbonaceous material.

The present invention also includes a method for modifying activated carbon comprising: heating said activated carbon to a temperature in the range between about 300 to 1400° C. for a period of time in the range between about 0.1 to 500 minutes in the presence of at least one gas selected from the group consisting of: steam, hydrogen, methane and/or natural gas, and mixtures thereof, provided that the mass ratio of at least one of these said gases to initial activated carbon is greater than about the following: 0.7 grams said steam: 1.0 grams initial dry activated carbon, and/or 0.35 grams said methane and/or natural gas: 1.0 grams initial dry activated carbon, and/or 0.35 grams said hydrogen: 1.0 grams initial dry activated carbon.

The present invention also includes a method for treating water comprising:

passing said water over an activated carbon that comprises: a pore volume per gram of said activated carbon more than about 0.32 mL in the pore width range between about 4 to 63 angstroms; and a pore volume per gram of said activated carbon more than about 0.21 mL in the pore width range between about 63 to 500 angstroms; provided that the pore volume per gram of said activated carbon in the pore width range of about 20 to 63 angstroms is at least about 25% of the total pore volume per gram of said activated carbon in said pore width range of 4 to 63 angstroms, as measured per the Argon Adsorption Density Functional Theory protocol, provided that said activated carbon has a pH equal to or greater than about 9.9, when immersed as a slurry in nitrogen-purged deionized distilled water, while the slurry contains about 10% by weight of activated carbon, as measured per the Slurry pH protocol.

The present invention also includes an activated carbon prepared from the method comprising: heating a carbonaceous material to a temperature in the range between about 300 to 1400° C. for a period of time in the range of about 0.1 to 500 minutes, thereby forming said activated carbon then washing said activated carbon with an acid that has a molarity greater than about $10^{-4}$ M, then heating acid washed activated carbon to a temperature in the range between about 300 to 1400° C. for a period of time between about 0.1 to 500 minutes, in the presence of at least one gas selected from the group consisting of: steam, methane, natural gas, hydrogen, nitrogen, ammonia, benzene, propane, and mixtures thereof.

BRIEF DESCRIPTION OF THE DRAWINGS

FIG. 1 is a graph comparing MIB breakthrough profiles in Norristown water for untreated commercially available activated carbon versus activated carbon that has been heat-treated in a hydrogen atmosphere at 1025° C.;

FIG. 2 is a graph comparing MIB breakthrough profiles in Norristown water for untreated commercially available activated carbon versus activated carbon that has been heat-treated in a hydrogen atmosphere at 1025° C., and activated carbon that has been heat-treated in a steam atmosphere at 375° C., and then ramped to 850° C. in a nitrogen environment;

FIG. 3 is a graph comparing MIB breakthrough profiles in Norristown water for untreated commercially available activated carbon versus activated carbon that has been heat-treated in a hydrogen atmosphere at 1025° C., activated carbon that has been heat-treated in a combined steam/methane environment at 600° C., and activated carbon that has been heat-treated in a steam/methane environment at 850° C.;

FIG. 4 is a graph comparing MIB breakthrough profiles in Norristown water for untreated commercially available activated carbon versus activated carbon that has been heat-treated in a hydrogen atmosphere at 1025° C., activated carbon that has been heat-treated in a combined steam/methane environment at 1000° C., and activated carbon that has been heat-treated separately in a methane environment followed by heat treatment in a steam environment at 1000° C.;

FIG. 5 is a graph comparing MIB breakthrough profiles in Norristown water for untreated commercially available activated carbon versus activated carbon that has been heat-treated in a combined steam/methane environment at 1000° C., activated carbon that has been heat-treated separately in a methane environment followed by heat treatment in a steam environment at 1000° C., and activated carbon that has been heat-treated in a steam environment at 1000° C.;

FIG. 6 graphs the pore size distribution for untreated commercially available activated carbon versus activated carbon that has been heat-treated in a hydrogen atmosphere at 1000° C., activated carbon that has been heat-treated in a steam atmosphere at 375° C. and then ramped to 850° C. in nitrogen with a steam residual, activated carbon that has been heat-treated in a combined steam/methane environment at 850° C., activated carbon that has been heat-treated in a combined steam/methane environment at 1000° C., activated carbon that has been heat-treated separately in a methane environment followed by heat treatment in a steam environment at 1000° C., and activated carbon that has been treated in a steam environment at 1000° C.;

FIGS. 7a–c are graphs that depict the correlation between MIB breakthrough performance and cumulative pore volume for various pore width ranges;

FIG. 8 is a graph that demonstrates natural organic matter uptake (as measured by total organic carbon—TOC) for public-domain bituminous coal-based activated carbons versus surface-modified bituminous coal-based activated carbons;

FIG. 9 is a graph that demonstrates net surface charge distribution for commercially available virgin bituminous coal-based activated carbons versus surface-modified virgin bituminous coal-based activated carbons;

FIG. 10 is a graph which demonstrates pore size distribution for commercially available virgin bituminous coal-based activated carbons versus surface-modified virgin bituminous coal-based activated carbons (with the two curves right on top of one another); and FIG. 11 is a graph plotting zeta potential of steam and methane/steam treated activated carbon following varying periods of oxygen exposure.

DETAILED DESCRIPTION OF THE PREFERRED EMBODIMENT

The present invention encompasses several techniques for enhancing the adsorption capacity of commercial activated carbons for odor-causing compounds such as 2-methylisoborneol (MIB) and geosmin. The techniques involve heat treatments in gas environments, comprised of one or more of the following gases: hydrogen, steam, methane, and/or natural gas, ammonia, propane, or benzene. These treatments promote favorable chemical and/or physical changes in activated carbon pores and internal surfaces. By carefully controlling the temperature, environment, and time of exposure during these heat treatments, activated carbons can be "tailored" to achieve superior adsorption capacities. Lab-scale experiments have demonstrated that the treatments herein produce carbons with much higher MIB adsorption capacities than current commercial carbons. To date, odorant adsorption experiments conducted by the present inventors have focused on MIB uptake, since it was previously established that MIB is as difficult or more difficult to remove than geosmin. Therefore, an activated carbon exhibiting superior MIB uptake should work well for removing geosmin. Other adsorption experiments have shown that the tailored carbons included in this invention adsorb more natural organic matter than commercial carbons, and this heightened capacity may apply to a variety of other organic compounds.

EXAMPLE 1

The bench-scale heat treatments described below were performed in a tubular quartz glass furnace. Unless otherwise noted, a sample (typically 300–1100 mg) of commercially available, lignite-based activated carbon that had been acid-washed (hereafter identified as "commercial carbon") was suspended within the furnace in a basket constructed of stainless steel mesh. The sample was first heated in a flow of pure nitrogen until the desired temperature was reached. Next, while maintaining the target temperature, the "treatment gases" were applied to the sample. In general, treatment gas flow rates ranged from 70 to 140 mL/min and the total treatment time ranged from 10 to 60 minutes. Upon completion of a treatment, the furnace was again flooded with nitrogen and allowed to cool. Samples were stored in a dessicator under vacuum until the adsorption experiments were performed.

The pilot-scale heat treatments described below were performed in a cylindrical kiln furnace that rotated about a horizontal axis. These pilot tests employed 1000–1500 grams (initial dry mass) of lignite-based activated carbon that had been acid-washed. The natural gas heat treatments proceeded for 0–10 minutes at 1000° C., and the steam heat treatments proceeded for 0–25 minutes at 1000° C. When steam was used, the mass ratio of steam-to-initial dry activated carbon was greater than about 0.7:1.0. When natural gas was used, the mass ratio of natural gas-to-initial dry activated carbon was greater than about 0.35:1.0.

A Standardized Mini-Column MIB Adsorber Test protocol was used to determine the 2-methylisobomeol (MIB) adsorption performance of small contactors filled with activated carbon grains. These tests were conducted using treated water that discharged from the clarifiers at the Norristown water purification facility of the Pennsylvania-American Water Company (Norristown, Pa.) (hereafter identified as the "Norristown plant"). This water had previously undergone full-scale chlorination, coagulation (with ferric chloride), and clarification through Superpulsators™. The Norristown plant utilizes filter-bed adsorbers for odor control, and the water samples utilized herein were collected just prior to these full-scale filter-bed contactors. In other words, the laboratory tests in this work employed the same water as would have been processed by full-scale activated carbon beds. This water contained 3.7 mg/L of natural organic matter, measured as total organic carbon (TOC); other water quality parameters for the Norristown water sample are listed in Table 1. In general, the Standardized Mini-Column MIB Adsorber test protocol could employ any surface water used as a municipal water supply that contains the specified level of natural organic matter (measured as total organic carbon).

TABLE 1

Water Quality Parameters for the Norristown Water Purification Facility

| | |
|---|---|
| Turbidity (NTU) | 2.6 |
| pH | 7.8 |
| Alkalinity (mg/L as CaCO$_3$) | 65 |
| Initial TOC (mg/L) | 3.7 |

The Standardized Mini-Column MIB Adsorber Test protocol employed $^{14}$C-labeled MIB. Radiolabeled MIB was purchased from American Radiolabeled Chemicals (ARC) and it exhibited a specific activity of 55 mCi/mM (mCi=millicuries, mM=millimoles/L). Consequently, when this material was spiked into experimental waters, the resultant MIB concentrations were directly proportional to the radioactivity of those waters. Radioactivity was measured using a scintillation counter (Wallac 1217 Rackbeta), and this required combining samples with scintillation cocktail. For the tests herein, 2.5 mL aliquots of sample water were combined with 18 mL of scintillation cocktail. Once the radioactivity of an aliquot was determined, the MIB concentration could be calculated using the following equation, where dpm stands for "disintegrations per minute."

$$\text{concentration (ng/L)} = \left(\frac{\text{activity (dpm)}}{2.5 \text{ mL}}\right)\left(\frac{1 \text{ mCi}}{2.22 \times 10^9 \text{ dpm}}\right)$$
$$\left(\frac{1 \text{ mM MIB}}{55 \text{ mCi}}\right)\left(\frac{1.683 \times 10^8 \text{ ng MIB}}{1 \text{ mM MIB}}\right)\left(\frac{1000 \text{ mL}}{1 \text{ L}}\right)$$

Due to the inherent variability of the scintillation counter, the detection limit for this protocol (under the given conditions) was about 3–4 ng/L.

Unless otherwise indicated, the MIB adsorption studies described herein were conducted according to the Standardized Mini-Column MIB Adsorber (SMCMA) test protocol. This protocol employed mini-columns (Standardized Mini-Column MIB Adsorbers) that were designed to simulate the performance of full-scale filter-bed absorbers, similar to those found at the Norristown plant and a number of other full-scale water treatment plants. The Norristown adsorbers provide a rated empty-bed contact time (EBCT) of 7.6 minutes, and this is within the range of typical values for systems that employ activated carbon. A comparison of full-scale and Standardized Mini-Column MIB Adsorber parameters is given in Table 2.

TABLE 2

Comparison of Full-scale and Standardized Mini-Column MIB Absorber (SMCMA) Parameters

| | Full-scale | SMCMA |
|---|---|---|
| Grain Size (micrometers) | 400 to 1700 | 75 to 90 |
| Hydraulic Loading Rate (m/s) | 0.0013 | 0.0026 |
| Empty-Bed Contact Time (min.) | 7.6 | 0.071 |
| Carbon Bed Dimensions | 23 ft (l) × 23 ft (w) × 3 ft (d) | 1.1 cm (l) × 0.6 cm (dia.) |
| Time to Process 5000 Bed Volumes | 26 days | 5.9 hours |

For these Standardized Mini-Column MIB Adsorber tests, the Norristown water that is characterized above was spiked with 130–140 parts per trillion of $^{14}$C-MIB and then processed through a SMCMA. Influent and effluent $^{14}$C-MIB concentrations were monitored at regular intervals so as to determine the "breakthrough profile" of the carbon being tested.

The pore volume and pore size distribution data were collected by means of an Argon Adsorption Density Functional Theory protocol. This protocol employed a Micromeritics ASAP 2000 or 2010 pore analyzer, which generates argon adsorption isotherms. Argon adsorption isotherms were determined in the relative pressure range of $10^{-6}$ to 0.99, and each isotherm included 60–133 data points. For each data point, gaseous argon was pulsed into a sample chamber that contained about 0.3 g of activated carbon sample and was immersed in liquid argon (87.3 K). Following a 0.5 to 3 hour equilibration period, the relative pressure in the chamber was recorded. Tests began at low relative pressure ($10^{-6}$) and proceeded to the final pressure of 0.99. Completed isotherms were interpreted via the software package provided with the Micromeritics equipment, which utilizes the Density Functional Theory in converting isotherm data to pore size distributions.

Slurry pH measurements were made via a Slurry pH protocol. This entailed combining 0.5 to 0.6 grams of powdered carbon (<325 mesh size, or <45 micrometers) with 5 mL of deionized water (Milli-Q™ Water System—Millipore Corporation, Bedford, Mass.) that had been purged with nitrogen. The slurry was agitated for 24 hours, after which the pH (considered to be the equilibrium pH) was measured. Previous research suggests that the equilibrium pH of an activated carbon reflects its $pH_{pzc}$. The $pH_{pzc}$ of a material is the pH at which that material's net surface charge is zero, as determined by surface titrations.

Surface charge titrations were conducted using a Mettler-Toledo DL53 automatic titrator. For these tests, carbon samples were immersed in an electrolyte solution (either 0.01 molar or 0.1 molar sodium chloride), and after adding a fixed volume of 1.0 molar sodium hydroxide, this solution was titrated with incremental volumes of 0.1 molar hydrochloric acid. Titrations were also performed in the absence of activated carbon, and these "blanks" were compared to the carbon titrations to determine the surface charge.

Batch MIB adsorption studies were conducted using 40 mL borosilicate vials with Teflon-lined closures. In standard tests, the vials were filled with clarified Norristown water (i.e., the same water as listed above) that contained the appropriate dose of $^{14}$C-labeled MIB. Carbon samples were powdered (<325 mesh size, or <45 micrometers), combined with deionized water, and added to the batch reactors as slurries. The vials were then sealed so that no headspace remained. Each vial contained an equal number of glass beads to promote mixing while the vials were agitated on a rotating tumbler. Following a 24-hour contact period, samples were collected using a syringe and filtered through a 0.2 μm cellulose acetate syringe filter.

The total organic carbon (TOC) adsorption studies referenced herein were conducted using filtered water from the Cincinnati Water Works Richard Miller Treatment Plant. This water had previously undergone full-scale coagulation (with aluminum sulfate), clarification, and filtration. It contained 1.2 mg/L TOC, 0.07 NTU turbidity, 66 mg/L alkalinity (as $CaCO_3$), and exhibited a pH of 7.9. Batch TOC adsorption tests were conducting using 20-liter polycarbonate containers. These were filled with Cincinnati water and dosed with varying amounts of activated carbon. Following a one-week equilibration period, the remaining TOC in each vessel was measured using a Shimadzu TOC-5000A TOC analyzer.

It was observed that heat treatments in pure hydrogen greatly improved the MIB adsorption capacity of the commercial carbon. For example, a one-hour treatment in pure hydrogen at 900° C. increased MIB removal under standard batch adsorption conditions from 60% with the untreated carbon, up to 75% with the treated carbon. The standard batch adsorption experiments referenced herein utilized clarified river water from Norristown, Pa., with an initial spiked $^{14}$C-MIB concentration of 135 ng/L and an initial background natural organic matter level that exhibited a total organic carbon concentration of 3.7 mg/L. A one-hour treatment in pure hydrogen at 1025° C. increased MIB removal to 95% under these conditions (this carbon is identified herein as "H2(1025)"). In these treatments hydrogen gas was applied at a rate of 70 mL/min and the sample mass was 220 mg, meaning the ratio of total applied hydrogen to activated carbon (on a mass basis) was 1.7:1.

In Standardized Mini-Column MIB Adsorber tests H2(1025) processed about 5000 bed volumes before initial detectable breakthrough (i.e., up to 4 parts per trillion) occurred and about 10,000 bed volumes before the effluent $^{14}$C-MIB concentration exceeded 10 parts per trillion (10 ppt-breakthrough) (FIG. 1 and Table 3). In comparison, the untreated commercial carbon processed about 2600 bed volumes prior to initial detectable breakthrough and about 5000 bed volumes prior to 10 ppt-breakthrough.

Heat treatments in steam environments also caused significant improvements in MIB uptake by the commercial carbon. For instance, a one-hour treatment in steam at 375° C. (with a ratio of 11.7 grams of steam applied per gram of initial dry activated carbon), followed by ramping in pure nitrogen to 850° C. (50° C./min.), increased MIB removal from 60% to 75% under the batch conditions described above. The aforementioned steam treatment therefore increased MIB adsorption capacity as much as the one-hour hydrogen treatment at 900° C. In a Standardized Mini-Column MIB Adsorber test, this same steam-treated carbon (identified as "H2O (375), N2(850)" in the accompanying figures) processed about 4500 bed volumes prior to initial detectable breakthrough and about 7000 bed volumes prior to 10 ppt-breakthrough (FIG. 2). One-hour steam treatments at 600° C. (identified as "H2O (600)") produced roughly the same Standardized Mini-Column MIB Adsorber results as for H2O (375), N2(850).

It was also discovered that heat treatments in various combinations of steam and pure methane could improve MIB uptake. Following a one-hour exposure to a steam/methane mixture (6:1 molar ratio of steam to pure methane) at 600° C. (identified as "CH4/H2O (600)" in the accompanying figures), the experimental carbon performed as well as a hydrogen-treated carbon during the first 6000–10,000 bed volumes of a mini-column test (FIG. 3). In this treatment 9.5 grams of steam and 0.97 grams of methane were applied per gram of initial dry activated carbon. A similar result was observed following a 23-minute exposure to steam and methane (1:1 molar ratio) at 850° C. (identified as "CH4/H2O (850)" in FIG. 3). Here again, the treated carbon processed about 5,000 bed volumes prior to initial breakthrough and about 10,000 bed volumes prior to 10 ppt-breakthrough. In preparing CH4/H2O (850), 10.5 grams of steam and 7.5 grams of methane were applied per gram of initial dry activated carbon.

Favorable MIB removal also occurred after exposing the commercial carbon to a combination of steam and methane (1:1 molar ratio) at 1000° C. This treatment lasted 18 minutes, during which 2.9 grams of steam and 2.0 grams of methane were applied per gram of initial dry activated carbon. The resultant material (identified as "CH4/H2O (1000)-1" in the accompanying figures) processed 10,000 bed volumes prior to initial breakthrough and 15,000 bed volumes prior to 10 ppt-breakthrough (FIG. 4). Similar breakthrough performance was observed following separate application of methane followed by steam. In this case, a carbon sample (identified as "CH4/H2O (1000)-2" in the accompanying figures) was heated to 1000° C. and exposed to pure methane until it gained 13% mass. Thereafter it was exposed to steam (no methane) until it lost 25% of its pyrolyzed mass. In this treatment, 0.9 grams of methane and 1.6 grams of steam were applied per gram of initial dry activated carbon.

The authors observed that some residual steam was present during the cooling phase of the above-listed methane/steam trials.

One important benefit of the "methane deposition" phase of methane/steam treatment is that it offsets the mass loss accompanying the "steam oxidation" phase. Activated carbons are normally sold according to weight, and for this reason, activated carbon manufacturers may avoid using production protocols that cause excessive mass loss. Another potential advantage of the "methane deposition" phase is that it promotes important physical/chemical changes within activated carbon. When carbon samples were exposed to steam at 1000° C. until 20–25% mass loss occurred (without prior exposure to methane), their MIB breakthrough performance in Norristown water was also improved over existing commercial grades of activated carbon that were tested, but they were less favorable than if methane had also been applied. As shown in FIG. 5, a carbon exposed solely to steam (with no methane) at 1000° C. (identified as "H2O (1000)") exhibited almost immediate (but slight) MIB breakthrough, and it processed 10,000 bed volumes prior to 10 ppt-breakthrough. Although its break-through profile was shallow, this carbon might be considered inferior to a carbon exhibiting more rapid breakthrough, if that carbon achieved a longer period of no detectable breakthrough. Water utilities tend to prefer treatments that completely remove MIB from finished water, due to its extremely low odor threshold concentration (7–15 ng/L).

Equilibrium pH measurements for hydrogen-, steam-, and methane+steam-treated samples (as well as for other experimental carbons not discussed herein) revealed that MIB uptake was linked to equilibrium pH. In general, carbons that exhibited high equilibrium pH (above 9) were able to remove more MIB in standard batch tests than carbons that exhibited low equilibrium pH (below 6). The equilibrium pH values for steam-, hydrogen-, and methane+steam-treated carbons were all in the range of 10.3 to 10.6.

Pore size distribution measurements for the experimental carbons described above are shown in FIG. 6. These curves reveal a distinct correlation between the pore volume of hydrogen- and steam/methane-treated carbons and their respective MIB breakthrough performance in Norristown water. As shown in FIG. 5, the period of below-detectable-breakthrough for a number of experimental carbons (some of which are not described herein) was proportional to pore volume in certain pore size ranges, with the exception of steam-treated carbon (heated to 1000° C., identified by an "X" in FIG. 7). The authors suspect that the steam-treated carbon contained more surface acidic groups than carbons that were also exposed to methane.

To assess the impact of hydrogen treatment on TOC removal, samples of bituminous coal-based carbon were heated to 1000° C. and then exposed to hydrogen for one hour. These samples included a virgin (previously unused) material, and two carbons that had undergone either 5 or 12 cycles of water treatment service (for TOC removal) and thermal reactivation. Standard batch TOC removal tests (as described above) revealed that hydrogen treatment enhanced TOC adsorption. As shown in FIG. 8, the TOC uptake (as measured in mg TOC/g GAC) of hydrogen-treated ("surface-modified") carbons was 10–200% higher than for untreated ("as-received") samples when the equilibrium TOC concentration was between 0.1 to 0.85 mg/L.

Surface charge titrations of the "as-received" and "surface-modified" versions of the virgin sample are shown in FIG. 9. Clearly the "surface-modified" sample has a higher net surface charge in the pH range of 4–10, and this indicates that it contains fewer surface acidic groups than the "as-received" carbon. Moreover, the "as-received" activated carbons exhibited zero net surface charge ($pH_{pzc}$) at pH values between 8.5 (for the virgin carbon) and 9.5 (for the thermally reactivated carbons—not shown herein), whereas the "surface-modified" activated carbons exhibited zero net surface charge at pH values above 10.0–11.0 (see FIG. 9). Furthermore, pore size distribution measurements (FIG. 10) revealed that the pore structure of "surface-modified" and "as-received" virgin carbon was nearly identical. This indicates that surface acidic groups and the $pH_{pzc}$ (surface chemistry) were important controlling factors in the TOC adsorption tests discussed above.

Industries that employ activated carbon must routinely face the costs and operational challenges associated with removing and replacing carbon that has lost its capacity for removing contaminants. The invention described herein would facilitate the manufacture of activated carbons requiring less frequent replacement than current commercial carbons. These "tailored" carbons could greatly lower the operational costs of many activated carbon applications, particularly for odor control.

TABLE 3

2-Methylisoborneol Breakthrough during Standardized Mini-Column MIB Adsorber Tests (initial $^{14}$C-MIB concentration = 130–140 parts per trillion (ppt))

| Activated Carbon | Background TOC (mg/L) | Bed Volumes to Initial Detectable Breakthrough (4 ppt) | Bed Volumes to 10 ppt-Breakthrough | Pore Volume: 4–63 angstroms (mL/g) | Pore Volume: 63–500 angstroms (mL/g) | Slurry pH |
|---|---|---|---|---|---|---|
| Activated Carbons of the Invention | | | | | | |
| H2(1025) | 3.7 | 5000 | 10,000 | 0.37 | 0.33 | 10.6 |
| H2O(375),N2(850) | 3.7 | 4500 | 7000 | 0.31 | 0.21 | 10.6 |
| H2O(600) | 3.7 | 4500 | 7000 | N/A | N/A | N/A |
| CH4/H2O(600) | 3.7 | 5000 | 8000 | N/A | N/A | N/A |
| CH4/H2O(850) | 3.7 | 5000 | 9000 | 0.37 | 0.24 | N/A |
| CH4/H2O(1000)-1 | 3.7 | 10,000 | 15,000 | 0.44 | 0.27 | 10.4 |
| CH4/H2O(1000)-2 | 3.7 | 10,000 | 15,000 | 0.42 | 0.23 | 10.4 |

TABLE 3-continued

2-Methylisoborneol Breakthrough during Standardized Mini-Column MIB Adsorber Tests (initial $^{14}$C-MIB concentration = 130–140 parts per trillion (ppt))

| Activated Carbon | Background TOC (mg/L) | Bed Volumes to Initial Detectable Breakthrough (4 ppt) | Bed Volumes to 10 ppt-Breakthrough | Pore Volume: 4–63 angstroms (mL/g) | Pore Volume: 63–500 angstroms (mL/g) | Slurry pH |
|---|---|---|---|---|---|---|
| H2O(1000) | 3.7 | 2000 | 10,000 | 0.45 | 0.22 | 10.4 |
| Pilot A | 2.0 | 3000 | 10,800 | 0.34 | 0.27 | 10.3 |
| Pilot B | 2.0 | 8500 | 13,500 | 0.35 | 0.29 | 10.0 |
| Pilot C | 2.0 | 7600 | 13,500 | 0.44 | 0.50 | 9.9 |
| Commercially Available Activated Carbons | | | | | | |
| Commercial Lignite A | 3.7 | 2600 | 5000 | 0.28 | 0.18 | 5.7 |
| Commercial Lignite B | 2.0 | 2100 | 5400 | 0.30 | 0.29 | N/A |
| Commercial Lignite C | 3.5* | 2300 | 4100 | 0.34 | 0.36 | 5.5 |
| Commercial Lignite C | 6.0** | 1000 | 2100 | 0.34 | 0.36 | 5.5 |
| Commercial Bituminous A | 4.0 | 0 | 2800 | 0.37 | 0.05 | 9.8 |
| Commercial Bituminous A | 3.0 | 1000 | 5000 | 0.37 | 0.05 | 9.8 |
| Commercial Bituminous A | 1.8 | 500 | 5300 | 0.37 | 0.05 | 9.8 |
| Commercial Bituminous B | 1.8 | 500 | 5100 | 0.35 | 0.03 | 8.9 |
| Commercial Wood-based | 3.5* | 7000 | 11,200 | 1.08 | 0.35 | 6.3 |
| Commercial Wood-based | 6.0** | 4000 | 6100 | 1.08 | 0.35 | 6.3 |

*water sampled from Manatee, FL; initial $^{14}$C-MIB concentration = 80 ppt.
**water sampled from Hillsborough, FL; initial $^{14}$C-MIB concentration = 80 ppt.

EXAMPLE 2

Slurry pH and zeta potential are two useful parameters for characterizing the surface charge and surface properties of activated carbons. Zeta potential (ZP) can represent the external charge of an activated carbon grain immersed in water, and is not affected by charged sites within the grain (that are remote because of diffusion limitations). The zeta potential of an activated carbon grain is influenced by the quantity of acidic, oxygen-containing functional groups on the grain's external surfaces. With this in mind, the zeta potential of several steam- and methane+steam-treated carbons were compared. These included two samples that were prepared in a bench-scale tubular quartz glass furnace, as described in Example 1 above, and two samples that were prepared in a pilot-scale rotary kiln furnace. The bench-scale samples are identified as S-1000 and MS-11000, where S-1000 was treated in steam at 1000° C. and MS-1000 was treated in methane followed by steam at 1000° C. The pilot-scale samples are identified as Pilot A and Pilot B.

To assess the relative propensity of these carbons to adsorb oxygen onto their external surfaces, their zeta potential was measured following varying periods of oxygen exposure by means of the mobility-based zeta potential protocol. For this protocol, 50 mg of activated carbon were mixed into 200 ml of distilled-deionized water, and pure oxygen gas was bubbled through the solution. The activated carbon grains had diameters between about 75 and 90 micrometers. At certain time intervals, 25 ml of each carbon/water suspension were collected and mixed with 25 ml of 0.2 M NaCl. The pH of these suspensions was then adjusted to pH 10.5 and the zeta potential of particles in these "adjusted suspensions" was determined using a standard model 501 Laser Zee Meter. Zeta potential measurements were carried out in the following manner: approximately 25 ml of "adjusted suspension" was injected directly into a quartz glass cell; the cell was placed under a microscope (Nikon SU equipped with a 20×, 0.4 N. A. objective and two 10× eyepieces mounted on a binocular head) where it was automatically illuminated by a laser beam. Next, an electric field was applied to the cell, and the voltage was adjusted manually until the carbon particles, as observed through the microscope, were stationary. A minimum of three zeta readings were taken for each sample, and the standard deviation in each case was less than 1.5 mV. Analyses were conducted within one minute of applying voltage, so as to minimize the zeta potential-altering effects of prolonged electrification that are related to diffusion and other phenomena.

Results are shown in FIG. 11 (values are listed in Table 4 below) and they indicate that the zeta potential of Pilot B and MS-1000 was relatively unaffected by exposure to oxygen. In contrast, the zeta potential of Pilot A and S-1000 became considerably more negative during the 24-hour test.

TABLE 4

Average zeta potential (mV) for steam- and methane + steam-treated carbons following varying periods of oxygen exposure

| Time, h | Pilot A | Pilot B | S1000 | MS1000 |
|---|---|---|---|---|
| 1 | −19.33 | −19.62 | −14.6 | −21.92 |
| 3 | −24.8 | −20.75 | −15.2 | −21.13 |
| 6 | −30.65 | −22.93 | −22 | −20.62 |
| 24 | −33.8 | −21.12 | −29.13 | −20.92 |
| Total mV change (from 1 to 24 h) | −14.47 | −1.5 | −14.53 | −1.0 |

The slurry pH of various carbons was measured in accordance with the Slurry pH protocol described above. Results are listed in Table 3, and these data, along with the results shown in Table 4, indicate that slurry pH, changes in zeta potential, and pore volume distribution (see Table 3) are all important parameters for predicting how well an activated carbon will remove MIB from water that also contains natural organic matter.

It should be understood that the foregoing description is only illustrative of the present invention. Various alternatives and modifications can be devised by those skilled in the art without departing from the invention. Accordingly, the present invention is intended to encompass all such alternatives, modifications and variances that fall within the scope of the following claims.

What is claimed is:

1. An activated carbon comprising:
   a pore volume per gram of said activated carbon more than about 0.32 mL in the pore width range between about 4 to 63 angstroms; and
   a pore volume per gram of said activated carbon more than about 0.21 mL in the pore width range between about 63 to 500 angstroms; provided that the pore volume per gram of said activated carbon in the pore width range of about 20 to 63 angstroms is at least about 25% of the total pore volume per gram of said activated carbon in said pore width range of 4 to 63 angstroms, as measured per the Argon Adsorption Density Functional Theory protocol and provided that said activated carbon exhibits a pH equal to or greater than 9.9, when immersed as a slurry in nitrogen-purged deionized distilled water, while the slurry contains about 10% by weight of activated carbon, as measured per the Slurry pH protocol;
   wherein pores having a diameter exceeding 200 angstroms contain about 33% to about 50% of the pore volume.

2. The activated carbon according to claim 1, wherein an activated carbon contactor comprising grains of said activated carbon is capable of removing about 12,000 bed volumes or greater of $^{14}$C-methylisoborneol down to below 10 parts per trillion of water having about 3.5 mg/L or greater of organic matter as total organic carbon as monitored per the Standardized Mini-Column MIB Adsorber protocol.

3. The activated carbon according to claim 1 where said activated carbon is capable of removing about 7500 bed volumes of $^{14}$C-MIB down to 4 parts per trillion of water having about 3.5 mg/L or greater organic matter as total organic carbon as monitored per the Standardized Mini-Column MIB Adsorber protocol.

4. The activated carbon according to claim 1, wherein said activated carbon exhibits a mobility-based zeta potential at a pH of 10.5 that does not change ± more than 3 mV between the time that said activated carbon is exposed for about 1 hour and about 24 hours to deionized distilled water through which an excess of gaseous oxygen is bubbled, as measured per the Mobility-Based Zeta Potential protocol.

5. The activated carbon according to claim 1, wherein said activated carbon exhibits a mobility-based zeta potential at a pH of 10.5 that does not change ± more than 17 mV between the time that said activated carbon is exposed for about 1 hour and about 24 hours to deionized distilled water through which an excess of gaseous oxygen is bubbled, as measured per the Mobility-Based Zeta Potential protocol.

6. The activated carbon according to claim 1 wherein said activated carbon is derived from coal.

7. The activated carbon according to claim 1 wherein said activated carbon removes natural organic matter.

8. The activated carbon according to claim 1 wherein said activated carbon removes methyl tert butyl ether, chlorinated organic compounds, aliphatic organic compounds, aromatic organic compounds, and/or mixtures thereof.

9. An activated carbon prepared by a method comprising:
   heating a carbonaceous material to a temperature in the range between about 300 to 1400° C. for a period of time in the range of about 0.1 to 500 minutes, thereby forming said activated carbon then washing said activated carbon with an acid that has a molarity greater than about $10^{-4}$ M, then
   heating acid washed activated carbon to a temperature in the range between above about 600 to about 1400° C. for a period of time between about 0.1 to 500 minutes, in the presence of at least one gas selected from the group consisting of: steam, methane, natural gas, hydrogen, nitrogen, ammonia, benzene, propane, and mixtures thereof, wherein said activated carbon comprises: a pore volume per gram of said activated carbon more than about 0.25 mL in the pore width range between about 4 to 63 angstroms; and a pore volume per gram of said activated carbon more than about 0.15 mL in the pore width range between about 63 to 500 angstroms; as measured per the Argon Adsorption Density Functional Theory protocol, provided that said activated carbon has a pH equal to or greater than 9.0, when immersed as a slurry in nitrogen-purged deionized distilled water, while the slurry contains about 10% by weight of activated carbon, as measured per the Slurry pH protocol;
   wherein pores having a diameter exceeding 200 angstroms contain about 33% to about 50% of the pore volume.

10. An activated carbon, comprising:
   a pore volume per gram of said activated carbon more than about 0.32 mL in the pore width range between about 4 to 63 angstroms; and
   a pore volume per gram of said activated carbon more than about 0.21 mL in the pore width range between about 63 to 500 angstroms; provided that the pore volume per gram of said activated carbon in the pore width range of about 20 to 63 angstroms is at least about 25% of the total pore volume per gram of said activated carbon in said pore width range of 4 to 63 angstroms, as measured per the Argon Adsorption Density Functional Theory protocol and provided that said activated carbon exhibits a pH equal to or greater than 9.9, when immersed as a slurry in nitrogen-purged deionized distilled water, while the slurry contains about 10% by weight of activated carbon, as measured per the Slurry pH protocol, whereby said activated carbon has not been mixed with sodium hydroxide or other alkaline material;

wherein pores having a diameter exceeding 200 angstroms contain about 33% to about 50% of the pore volume.

11. An activated carbon, comprising:

a pore volume per gram of said activated carbon more than about 0.32 mL in the pore width range between about 4 to 63 angstroms; and a pore volume per gram of said activated carbon more than about 0.21 mL in the pore width range between about 63 to 500 angstroms; provided that the pore volume per gram of said activated carbon in the pore width range of about 20 to 63 angstroms is at least about 25% of the total pore volume per gram of said activated carbon in said pore width range of 4 to 63 angstroms, as measured per the Argon Adsorption Density Functional Theory protocol and provided that said activated carbon exhibits a pH equal to or greater than 9.0, when immersed as a slurry in nitrogen-purged deionized distilled water, while the slurry contains about 10% by weight of activated carbon, as measured per the Slurry pH protocol, whereby said activated carbon has not been mixed with sodium hydroxide or other alkaline material;

wherein pores having a diameter exceeding 200 angstroms contain about 33 % to about 50 % of the pore volume.

12. An activated carbon composed of a carbonaceous material comprising:

a pore volume per gram of said activated carbon more than about 0.32 mL in the pore width range between about 4 to 63 angstroms; and a pore volume per gram of said activated carbon more than about 0.21 mL in the pore width range between about 63 to 500 angstroms; provided that the pore volume per gram of said activated carbon in the pore width range of about 20 to 63 angstroms is at least about 25% of the total pore volume per gram of said activated carbon in said pore width range of 4 to 63 angstroms, as measured per the Argon Adsorption Density Functional Theory protocol and provided that said activated carbon exhibits a pH equal to or greater than 9.9, when immersed as a slurry in nitrogen-purged deionized distilled water, while the slurry contains about 10% by weight of activated carbon, as measured per the Slurry pH protocol;

wherein pores having a diameter exceeding 200 angstroms contain about 33% to about 50% of the pore volume.

13. The activated carbon of claim 12, wherein said carbonaceous material is derived from coal or wood.

14. The activated carbon of claim 12, wherein said carbonaceous material has not yet been used to adsorb material selected from the group consisting of 2-methylisoborneol, geosmin, natural organic matter, methyl tert butyl ether, chlorinated organic compounds, aliphatic organic compounds, aromatic organic compounds, and mixtures thereof.

* * * * *

UNITED STATES PATENT AND TRADEMARK OFFICE
CERTIFICATE OF CORRECTION

PATENT NO. : 7,202,195 B2
APPLICATION NO. : 10/085469
DATED : April 10, 2007
INVENTOR(S) : Cannon et al.

It is certified that error appears in the above-identified patent and that said Letters Patent is hereby corrected as shown below:

In the Description
Column 1,
  Line 9, after "February 28, 2001" please add the following heading and paragraph:

--FEDERALLY SPONSORED RESEARCH AND DEVELOPMENT

This invention was made with support from the National Science Foundation under Grant No. BES 9805620. The Government has certain rights in the invention.--

Signed and Sealed this

Twentieth Day of May, 2008

JON W. DUDAS
*Director of the United States Patent and Trademark Office*